United States Patent [19]
Grande

[11] Patent Number: 5,928,617
[45] Date of Patent: Jul. 27, 1999

[54] PROCESS FOR REMOVAL OF MERCURY CONTAMINATION

[75] Inventor: Murray Gardner Grande, Healdsburg, Calif.

[73] Assignees: Quick Chemical Specialties Corp., Fort Lee, N.J.; Riverside Specialty Chemicals Inc., New York, N.Y.

[21] Appl. No.: 08/914,489

[22] Filed: Aug. 19, 1997

Related U.S. Application Data

[63] Continuation-in-part of application No. 08/697,083, Aug. 19, 1996, abandoned.

[51] Int. Cl.⁶ .................................................. C01B 17/02
[52] U.S. Cl. .................. 423/109; 423/567.1; 423/578.1; 23/293 S
[58] Field of Search ................ 423/210, 578.1, 423/567.1, 110, 109; 23/293 S

[56] References Cited

U.S. PATENT DOCUMENTS

| | | | |
|---|---|---|---|
| 2,841,536 | 7/1958 | Egbert | 423/578.1 |
| 3,661,509 | 5/1972 | Ferrara et al. | 23/25 |
| 4,044,098 | 8/1977 | Miller et al. | 423/210 |
| 4,094,777 | 6/1978 | Sugier et al. | 210/32 |
| 4,101,631 | 7/1978 | Ambrosini et al. | 423/210 |
| 4,206,183 | 6/1980 | Yamada et al. | 423/210 |
| 5,248,488 | 9/1993 | Yan | 423/210 |
| 5,281,259 | 1/1994 | Markovs | 95/134 |
| 5,409,522 | 4/1995 | Durham et al. | 75/670 |

FOREIGN PATENT DOCUMENTS

| | | | |
|---|---|---|---|
| 671048 | 10/1965 | Belgium | 423/210 |
| 1450243 | 10/1965 | France | 423/210 |
| 1 544 130 | 10/1970 | Germany | 423/210 |
| 37 18 284 A1 | 12/1987 | Germany | 423/210 |
| 44-5693 | 3/1969 | Japan | 423/578.1 |
| 61-238338 | 10/1986 | Japan | 423/210 |
| 694875 | 7/1953 | United Kingdom | 423/578.1 |

*Primary Examiner*—Gary P. Straub
*Assistant Examiner*—Timothy C Vanoy
*Attorney, Agent, or Firm*—Klauber & Jackson

[57] ABSTRACT

Process for removing mercury from a gas contaminated with mercury vapor, comprising the steps of cooling the contaminated gas, removing water vapor from the cooled gas and filtering the dehydrated gas through a medium comprised of pure elemental sulfur. The mercury bound to the medium may be removed by heating liquid carbon disulfide to form a carbon disulfide vapor, cooling the carbon disulfide vapor so that liquid carbon disulfide is formed, spraying the liquid carbon disulfide over the medium containing the bound mercury, so as to remove the mercury from the medium and allowing elemental sulfur to dissolve into the liquid carbon disulfide and allowing said elemental mercury to separate away from the elemental sulfur/carbon disulfide solution.

7 Claims, 3 Drawing Sheets

PROCESS FOR REMOVAL OF MERCURY CONTAMINATION

RELATED CASES

This is a continuation-in-part of application Ser. No. 697,083 filed Aug. 19, 1996, now abandoned.

FIELD OF THE INVENTION

The invention relates to processes for removing environmentally hazardous contaminants from gases, liquids and solids, and in particular to a method for removing/recovering mercury contamination from gases, liquids and solids.

BACKGROUND OF THE INVENTION

At standard atmospheric pressure and temperature, mercury (Hg) is a liquid metal. Elemental mercury is not found free and abundant in the environment, but vaporous mercury can be released in significant quantities during industrial processing of other natural resources, from mercury cell chloralkali plant exhaust gases and emission gases from hazardous waste treatment plants. Although mercury has many useful applications, it is considered a bio-hazardous material as its incorporation into human beings can cause birth defects, serious injury and may result in death. It is therefore desirable to reduce the introduction or emission of mercury into the environment to ensure the safety of the public and, for industry in which mercury is a waste or by-product, to avoid costly litigation commonly referred to as toxic torts.

One source of mercury vapor is naturally occurring geothermal steam and brine which usually contains varying amounts of non-condensible gases including "sour gas" comprised primarily of gaseous hydrogen sulfide ($H_2S$). Industrial applications for geothermal steam and brine require that the sour gas stream be treated with an oxidation reduction ("Redox") process well known to those skilled in this art. The presence of mercury vapor in the sour gas introduces a bio-hazard problem.

The Redox processing of sour gas oxidizes $H_2S$ and produces elemental sulfur (S). The produced sulfur attracts and chemically bonds with mercury vapor present in the sour gas. The result is production of solid sulfur typically contaminated with more than 20 parts per million (ppm) insoluble mercury. The EPA (Environmental Protection Agency) guidelines state that a mercury level in sulfur of 20 ppm or higher is hazardous, which renders such Redox sulfur unusable. The contaminated sulfur also requires expensive and difficult, hazardous waste disposal.

Mercury also contaminates natural gas-producing reservoirs at levels from as low as 8 micrograms per cubic meter ($\mu g/m^3$) to as high as 300 $\mu g/m^3$. Mercury vapor found in both sour and natural gas streams is chemically identical. It is crucial to remove mercury vapor from natural gas as it is extracted from reservoirs and before the gas is processed into usable fuel energy. Although mercury levels in naturally occurring fuel energy gas can be low, concentrations become cumulative in effect.

Mercury amalgamates with aluminum (Al) which is used in the construction of heat exchangers utilized by natural gas plants, especially on the welds of Al cold boxes. The result is severe damage to the heat exchangers in the form of stress cracking and corrosion which eventually leads to equipment failure, plant shutdowns and even fires.

Many attempts have been made to address the problem of mercury vapor contamination. For instance, early attempts included the use of mercury-containing compositions as catalysts to purify mercury vapor contaminated gases such as described in U.S. Pat. No. 3,661,509. Other approaches included pumping $H_2S$ into sulfur-free natural gas streams in conjunction with amine compounds to bind and separate away mercury vapor such as described in U.S. Pat. No. 4,044,098. Neither approach achieved the anticipated successes.

Metal-sulfides were next put to the test such as copper-sulfide (CuS) described in U.S. Pat. No. 4,094,777 and lead sulfide (PbS) described in U.S. Pat. No. 4,206,183. Unfortunately, the by-products of such heavy metal use were just as hazardous as the mercury vapor contamination to be removed.

Further attempts to filter mercury vapor included the use of zeolite molecular sieves such as $SiO_2/Al_2O_3$ described in U.S. Pat. No. 4,101,631 and zeolites coated with silver, gold and platinum disclosed in U.S. Pat. Nos. 5,281,259 and 5,409,522. Zeolite sieves work well as industrial scale catalysts in general, but are not particularly suited for filtering mercury vapor, and the use of precious metals for large scale mercury removal is economically unsound.

The current state-of-the-art in mercury vapor removal from gas streams is the use of filter vessels utilizing a bed of sulfur-impregnated activated carbon as described in U.S. Pat. No. 5,248,488. However, activated carbon in such applications often present certain hazards. Workers have to undertake time-consuming and costly safety measures with each bed-loading or bed replacement because activated carbon is highly flammable and activated carbon dust is toxic when inhaled. Geothermal sour gas contains oxygen ($O_2$) along with $H_2S$, and the combination of $O_2$ and flammable activated carbon can result in an exothermic reaction or simply, an explosion.

Geothermal sour gas, natural gas and petroleum gas streams are usually saturated with water vapor. Activated carbon tends to absorb this moisture. Wet activated carbon preferentially removes $O_2$ from the work environment and its depletion can lead to hypoxia and death. Workers who must enter the filter vessel under these conditions need to take extraordinary precautions such as wearing flame-retardant suits and masks hooked up to $O_2$ tanks.

Even after mercury is removed from a target gas, its problems and dangers remain in the spent activated carbon filters as elemental mercury and mercuric sulfide. Currently, the only practical method for removing mercury and mercuric sulfide from spent carbon is with a mercury retort. This is a very expensive procedure and is normally used only for small amounts of spent carbon or to recover mercury from other mercury-bearing items such as thermometers. As a result, spent activated carbon filters must be disposed of as hazardous waste without the practical possibilities of recycle.

Mercury contamination of effluent liquid streams such as industrial waste fluid discharges are just as serious as vaporous mercury in gas streams. Here too, the art has proposed many solutions for mercury removal such as leaching mercury-contaminated fluids with alkali-sulphide compounds (U.S. Pat. No. 4,017,369); using colloidal bituminous emulsions (U.S. Pat. No. 4,053,401); manganese nodules with occluded sulfur (U.S. Pat. No. 4,338,288); cement kiln dust (U.S. Pat. No. 4,844,815); copper sulfides (U.S. Pat. Nos. 5,245,106 & 5,350,728); iron salts (U.S. Pat. No. 5,308,500); and impregnating porous polystyrene resin with sulfur (U.S. Pat. No. 5,401,393).

The wide range of attempts and continued strife to develop a solution is moot testimony to the problem which exists in the art for a simple, yet effective method for removing mercury from a contaminated liquid stream.

It is with consideration to the above-identified drawbacks recognized in the art that this disclosure provides the following objects of the present invention.

OBJECTS OF THE INVENTION

It is an object of the present invention to provide a method for removing/recovering mercury from gases, liquids and solids.

Another object of the present invention is to provide a process for safely removing mercury vapor from a contaminated gas stream.

A further object is to provide a method for removing vaporous mercury from $H_2S$-bearing sour gas, natural fuel energy gas and petroleum fuel energy gas feed stocks.

Still a further object is to contribute a method of safely removing mercury from mercury cell chloralkali plant exhaust gases and emission gases from hazardous waste treatment plants.

Another object of the present invention is to provide a process for safely removing mercury from a contaminated liquid stream.

A further object is to provide a method for removing mercury from hazardous waste treatment plant, fluid turn-outs.

Yet another object is to present a safe and cost-effective process for mercury removal from solid elemental sulfur filter media subsequent to their use in gaseous or liquid mercury removal methods.

A further object of the invention is to provide for a process for mercury recovery from a spent sulfur pastille filter medium which also allows recycle of the sulfur which makes up the filter.

SUMMARY OF THE INVENTION

One aspect of the invention is a process for removing mercury from a gas contaminated with mercury vapor and comprises the steps of cooling the contaminated target gas, removing water vapor from the cooled gas, and filtering the dehydrated gas with a medium comprised of about 99.0 wt. % elemental sulfur. The cooling step should preferably cool the contaminated gas to about 200° F. and below. To remove water vapor, the target gas contaminated with mercury vapor can be passed through a physical moisture knockout vessel, reheated just before entering the filter medium with heaters, or through combinations thereof.

The chemistry of the filtering step is essentially a reaction between the mercury vapor and the elemental sulfur so that mercuric sulfide is formed and any unbound mercury is also adsorbed onto the elemental sulfur of the medium.

The filter medium can consist essentially of about 99.0 to about 99.98 wt. % elemental sulfur, i.e. the sulfur medium used in the present invention does not contain, is not bound to, nor associated with any other material elements except for the merest trace impurities.

The inventive process is particularly suited for cleaning mercury vapor contamination from $H_2S$-bearing sour gas, natural fuel energy gas, petroleum fuel energy gas, exhaust gas from mercury cell chloralkali plants and emissions from hazardous waste treatment plants disposing vaporous mercury. Those skilled in the art can readily adapt the presently disclosed process to other contaminated gases with results of equivalent scope.

Another aspect of the present invention is a process for recovering elemental mercury bound and adsorbed to the filter medium made of almost pure elemental sulfur. This aspect of the invention can also be viewed as a recycle method for the elemental sulfur as the two components are clearly separated. This aspect essentially uses the process for removing mercury from a gas contaminated with mercury vapor as outlined above, and additionally comprises the steps of heating liquid carbon disulfide to a temperature of about 117° F. to form a heated carbon disulfide vapor, cooling the heated carbon disulfide vapor so that a condensation solvent is formed, spraying the condensed solvent carbon disulfide over spent filter medium with mercury, dissolving the elemental sulfur in the carbon disulfide solvent and allowing insoluble elemental mercury and insoluble mercuric sulfide to separate away from the sulfur/carbon disulfide solution. Recovered elemental mercury is used as a substrate for other applications.

To separate elemental sulfur from the insoluble elemental mercury and insoluble mercuric sulfide, the sulfur/carbon disulfide solution is shunted to a separate container leaving the insoluble mercury behind. In the separate container, the carbon disulfide solvent is distilled away under suitable temperature and pressure conditions known to the art, leaving behind elemental sulfur cakes. The recovered sulfur is used as a substrate for further processing A further aspect of the present invention is a process for removing mercury from a fluid contaminated with mercury. The fluid mercury contaminant is allowed to react with the elemental sulfur medium so that mercuric sulfide is formed and, further, allowing any unbound mercury to be adsorbed onto the elemental sulfur medium.

The inventive process is particularly suited for cleaning the liquid turnout from hazardous waste treatment plants and the liquid brine waste products resulting from a mercury cell chloralkali process.

DETAILED DESCRIPTION OF THE INVENTION

The use of elemental sulfur pastilles in accordance with the present invention eliminates the dangers associated with the currently available state-of-the-art. As used herein, the term "pastille" refers to a solid tablet of elemental sulfur having the following characteristics:

| Sulfur Pastille | |
|---|---|
| High purity (S): | 99.0 to 99.98 wt. % |
| Moisture ($H_2O$): | trace to 0.00 vol. % |
| Carbon (C): | trace to 0.00 wt. % |
| Ash: | very low to none |
| Dust-free: | yes |
| Color: | bright yellow |

-continued

| Sulfur Pastille | |
|---|---|
| Melting point: | 235 to 246° F. |

The shape and dimensions of the pastille is dependent on the type of structure or vessel used as elaborated below and which one skilled in the art can easily adapt to after having the benefit of the present disclosure. The following is a comparison chart with other typical elemental sulfur screen sizes (U.S. Accepted Industrial Standards):

| Screens | |
|---|---|
| Elemental sulfur pastilles | 100% passes #4 screen |
| | 7% passes #8 screen |
| | 2% passes #16 screen |
| Elemental sulfur prills | 98% passes #14 screen |
| | 5% passes #100 screen |
| Elemental sulfur flakes | 99% passes #4 screen |
| | 5% passes #20 screen |
| Elemental sulfur lumps | 50% retained on #4 screen |
| | 50% retained on #8 screen |

EXAMPLE 1

Removal of Mercury from a Process Gas

Figure 1:
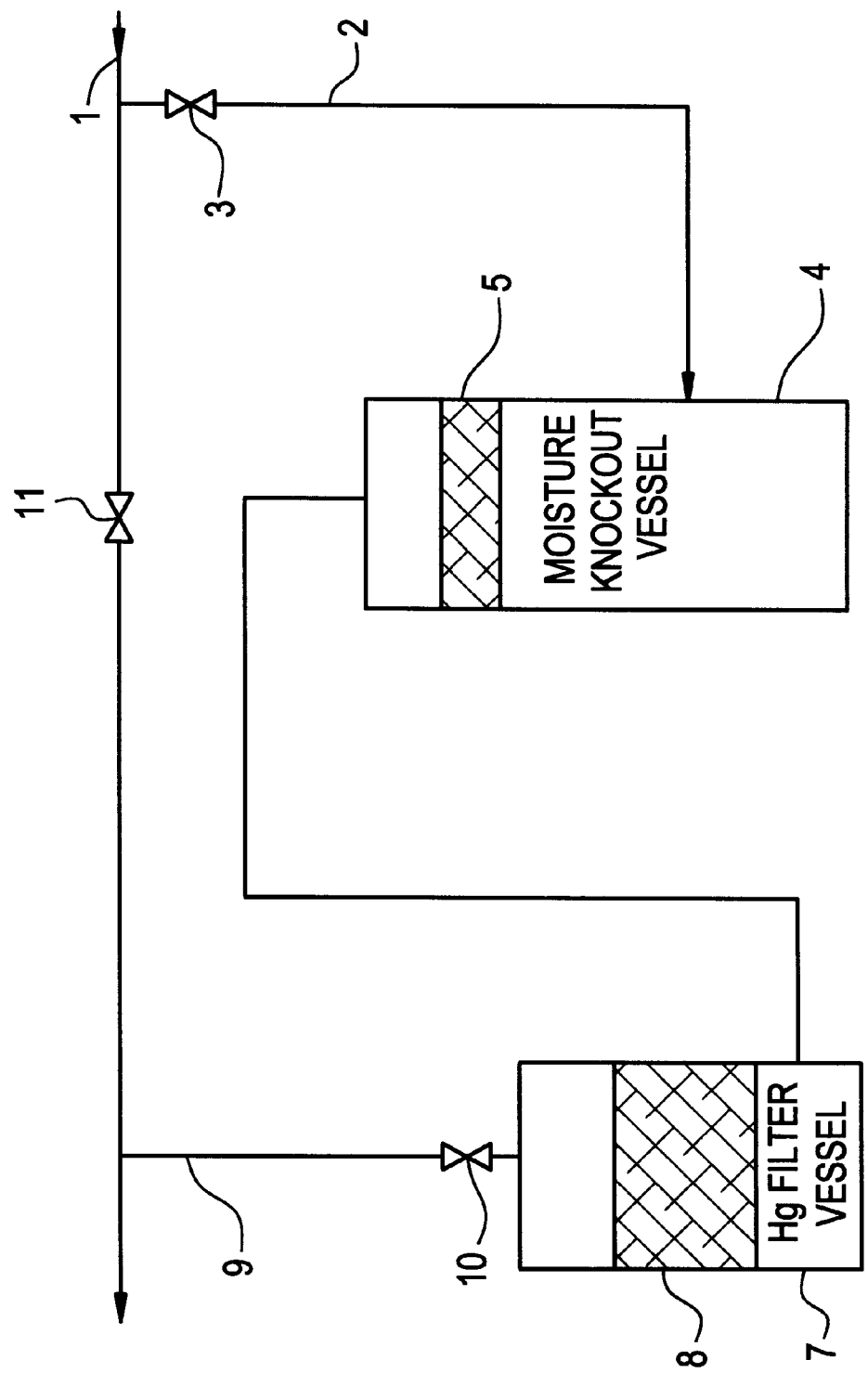
FIG. 1 is a flow chart broadly depicting the route of a mercury contaminated process gas stream through the apparatus associated with the present use of an elemental sulfur pastille medium.

In general overview and referring to FIG. 1, mercury contaminated process gas stream 1 is routed through moisture knockout vessel 4 and through mercury removal filter vessel 7 where the process gas flows through sulfur pastille media 8 and mercury contaminating the process gas is removed. As used herein the term "process gas" refers, to any gaseous emissions, both natural and artificial, contaminated with or containing vaporous Hg. The non-limiting examples of specific process gases given hereinbelow are $H_2S$-bearing sour gas, natural fuel energy gas, petroleum fuel energy gas, exhaust gases from a mercury cell chloralkali plant and emission gases in general from hazardous waste treatment plants disposing vaporous mercury.

Referring again to FIG. 1, mercury contaminated process gas stream 1 is routed through isolation valve 3 and process inlet pipe 2 to moisture knockout vessel 4. Any moisture (free or combined $H_2O$ vapor) present in the process gas is removed via demister 5. The efficiency of the subsequent Hg filtering is enhanced by removal of water from the process gas because moisture tends to corrode the essential components of the filter vessel and related equipment. Moisture removal can be accomplished by either passing the gas through a moisture knockout vessel such as item 4 shown in FIG. 1 and/or with pretreatment heaters. It is desirable to remove as close to 100% of the moisture as possible before the process gas enters filter vessel 7. One skilled in the art can appreciate that a combination of a knockout vessel and an upstream use of external heat with a preheater before the gas enters the filter vessel will ensure complete moisture removal. The capacity of the knockout vessel and the preheater(s) are determined by the gas flow rate and the average amount of moisture in the target gas.

Before being routed to the Hg filter vessel 7, it is often desirable to cool the gas. For example, gas emissions from hazardous waste treatment plants are typically about 480° F. It is desirable to cool the process gas down to about 200° F. or below to prevent the melting of the elemental sulfur media which has a melting point of about 235 to about 246° F. The process gas is passed through filter vessel 7 seeded with a bed of sulfur pastilles 8. The process gas flows upward through the sulfur pastilles where vaporous mercury is chemically attracted to elemental sulfur and converted to mercuric sulfide (HgS and/or $Hg_2S$) and then adsorbed onto the sulfur pastille media. The filter vessel size and the volume of the sulfur pastille filter bed are determined by gas flow rate, the average amount of vaporous mercury in the target gas stream and the allowable pressure drop across the filter bed.

The sulfur pastille filter medium is "re-seeded" when mercury concentrations in the treated gas approach maximum allowable values. This is done by physically turning the filter medium upside down, from bottom to the top. Re-seeding extends the medium's life and postpones replacement. The rationale is that the gas flow is from the bottom of the filter vessel and upward producing a gradient of $HgS/Hg_2S$ concentrations over time.

FIG. 1 shows that the filtered Hg-free process gas next flows through isolation valve 10 and process outlet pipe 9. In the event moisture knockout vessel 4 or filter vessel 7 becomes clogged, isolation valves 3 and 10 are closed and bypass valve 11 is opened. Process gas then bypasses the mercury removal filter and moisture knockout vessel to emergency contingency pathways while the clogged vessels are cleaned.

EXAMPLE 2

Removal of Mercury from Elemental Sulfur

Figure 2:
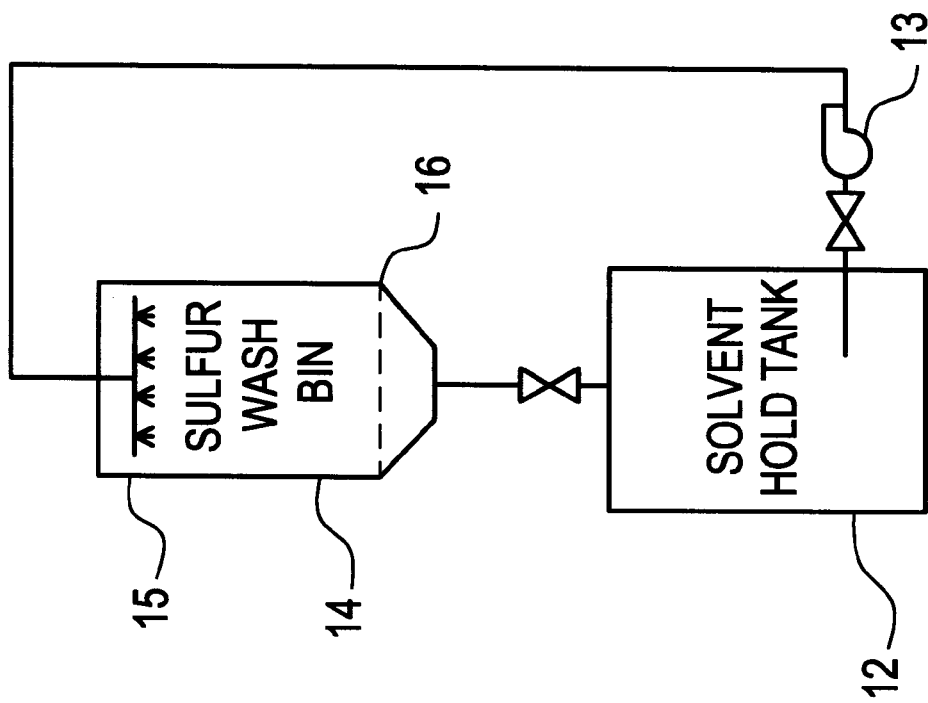
FIG. 2 depicts the removal route of mercury from a sulfur pastille medium contaminated additionally with hydrocarbons.
Figure 3:
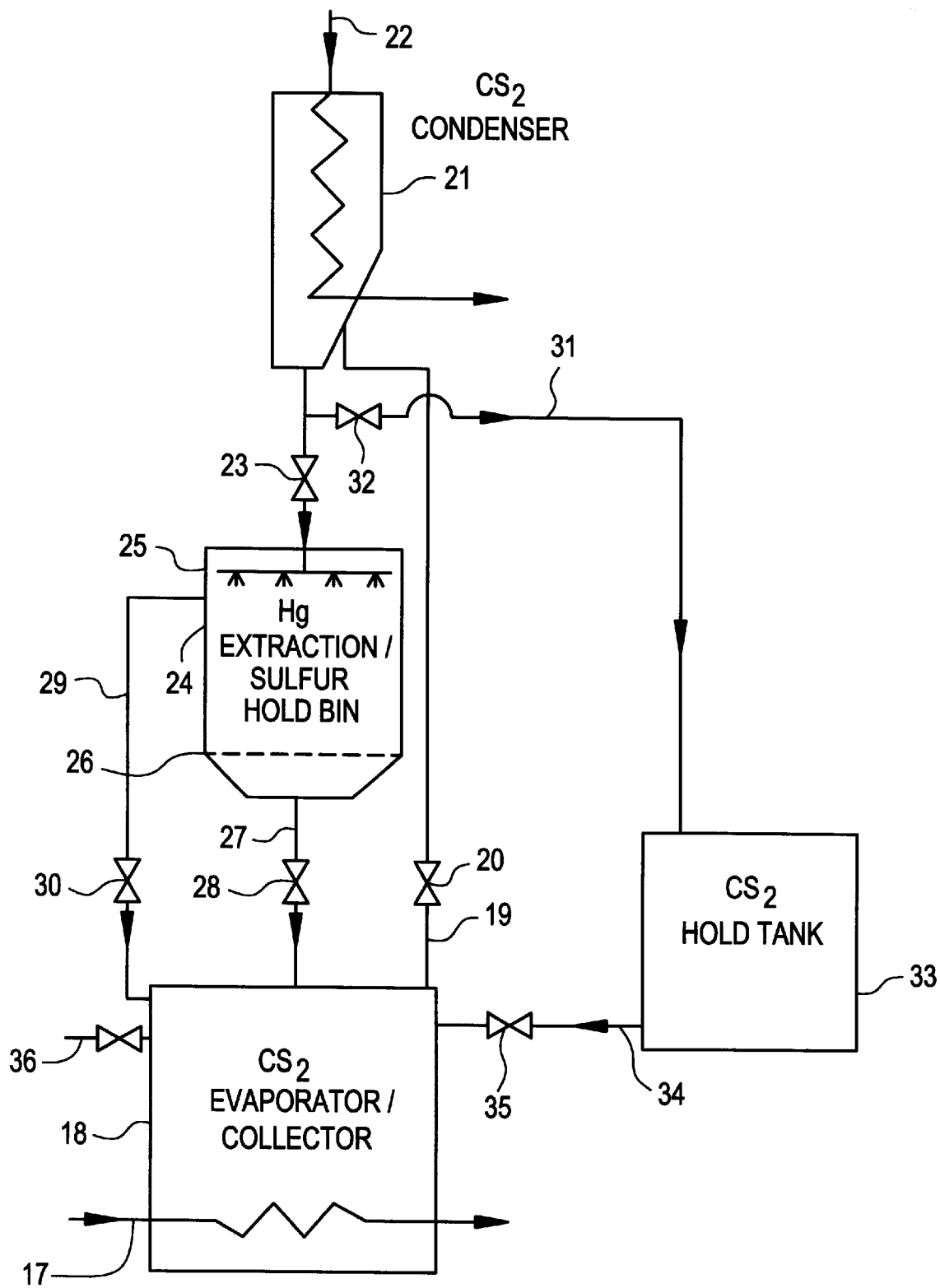
FIG. 3 shows the removal route of mercury from a sulfur pastille medium not contaminated with hydrocarbons.

After extended use over a period of time, the elemental sulfur media become saturated with mercury and the filter must be replaced. FIGS. 2 and 3 show, respectively, alternate routes for sulfur media contaminated additionally with hydrocarbons or those without additional hydrocarbon contamination. Sulfur media contaminated additionally with hydrocarbons are transferred to a sulfur wash bin 14 as shown in FIG. 9, while those without hydrocarbon contamination are forwarded to the Hg extraction/sulfur hold bin 24 as shown in FIG. 3.

FIG. 2 shows sulfur wash bin 14 connected to solvent hold tank 12 which contains a non-halogenated solvent. A preferred solvent for washing away hydrocarbons is acetone. Less or non-flammable solvent possibilities include 1,1,1 trichloromethane, trichloroethylene, perchloroethylene and aromatic solvents with good KB values and a higher flash point, such as toluene and hi-flash naphtha. Other possibilities of equivalent scope will be apparent to one skilled in the art.

Spent mercury contaminated sulfur media are loaded onto support grating 16 located in sulfur wash bin 14. Solvent circulation pump 13 is then started. Circulation pump 13 takes suction from solvent hold tank 12 and circulates it to the top of sulfur wash bin 14 where it is distributed via spray nozzles 15 over the bed of sulfur media. The solvent washes away any residual hydrocarbons from the process gas that may be present on the sulfur media. The solvent returns by gravity to solvent hold tank 12 for continued use. Spent solvent is recycled and replaced with fresh solvent as needed. The washed sulfur media are then removed from sulfur wash bin 14 and join the media without hydrocarbon contamination in the Hg extraction/sulfur hold bin 24 as shown in FIG. 3.

FIG. 3 shows evaporator/collector tank 18 which contains carbon disulfide ($CS_2$). The $CS_2$ is heated to about 117° F. (the vaporization point of $CS_2$) with hot heat exchanger 17. Heated $CS_2$ vapor passes through process line 19, past flow check valve 20 and continues up to the $CS_2$ condenser 21. $CS_2$ vapor then makes contact with cold heat exchanger 22 and begins to condense. The condensed $CS_2$ flows from the bottom of condenser 21 through isolation valve 23 and into the Hg extraction/sulfur hold bin 24 where it is distributed via spray nozzles 25 over the beds of sulfur media.

Mercury-contaminated sulfur media are supported on support grate 26 which incorporates a 170 to 220 micron mesh filter screen. As the $CS_2$ washes over the mercury-contaminated sulfur media, sulfur dissolves into the $CS_2$. Sulfur dissolved in $CS_2$ solution passes through check valve 28 via process line 27 and discharges into the $CS_2$ evaporator/collector tank 18. Mercury is left behind on micron filter screen 26.

Once in $CS_2$ evaporator/collector 18, the $CS_2$ is vaporized once again to repeat the process. As $CS_2$ vaporizes, sulfur is left behind in evaporator/collector 18. $CS_2$ is continuously vaporized and condensed until the mercury contaminated sulfur media located in Hg extraction/sulfur hold bin 24 is completely dissolved. If micron filter screen 26 becomes clogged, overflow line 29 allows return of excess $CS_2$ to evaporator/collector 18 through check valve 30.

Once all of the mercury contaminated sulfur media are dissolved, isolation valve 23 is closed and isolation valve 32 is opened. Vaporization of $CS_2$ from evaporator/collector 18 is continued and the condensed $CS_2$ is then routed to hold tank 33 through isolation valve 32 via process line 31. The process ends when all the $CS_2$ from evaporator/collector 18 is vaporized, condensed and collected in hold tank 33. Hot heat exchanger 17 is then valved out and decontaminated sulfur cake is collected from $CS_2$ evaporator/collector tank 18. The sulfur cake is utilized for other commercial applications.

Mercury is carefully collected from Hg extraction/sulfur hold bin 24. This mercury is also applied for other commercial ventures. Once sulfur and mercury have been removed, the $CS_2$ stored in hold tank 33 is drained back into evaporator/collector 18 through isolation valve 35 via process line 34. Any necessary makeup of $CS_2$ is then added to evaporator/collector 18 via the make up line 36. Isolation valves 32 and 35 are then closed and isolation valve 23 opened. The unit is then ready to process another batch of mercury contaminated sulfur media.

EXAMPLE 3

Removal of Mercury from Sour Gas

Naturally occurring sour gas which contains $H_2S$ also comprises trace to moderate amounts of vaporous elemental Hg. Most sour gas, whether geothermal or hydrocarbon, can be used as a substrate in a Redox process that harvests elemental sulfur in the form of cakes. To prevent mercury contamination in these sulfur cakes, it is necessary to remove the vaporous mercury from the sour gas before it is treated by Redox. For sour gas fed through a Redox process, the present invention allows the production of a sulfur cake with mercury levels of less than 20 ppm.

The first step in removing vaporous Hg from saturated sour gas is the elimination of $H_2O$ vapor, either with preheaters, a knockout box or combinations thereof as outlined in Example 1. The knockout box is energy efficient, but 100% moisture removal can require external heaters to remove the remaining bit of $H_2O$ vapor before the sour gas enters the filter vessel. Removal of moisture before treatment for mercury removal ensures peak efficiency of the sulfur pastille filter medium and prevents corrosion of the essential components of the filter vessel and related equipment.

EXAMPLE 4

Comparison Trials with S-impregnated Activated Carbon

Comparison trials at a geothermal field site were conducted over a four year period with one filter vessel containing elemental sulfur pastilles pursuant to the present invention, operating at the same time as an equal size filter vessel of sulfur-impregnated activated carbon (SIAC). The trials conclusively established that the sulfur pastilles removed vaporous mercury from saturated sour gas as efficiently and for as long a period without requiring filter bed replacement as does SIAC. When overall efficiency is compared, the present invention is vastly superior as it is conducted without the potential hazards and expenses associated with the use of activated carbon.

The geothermal field site used was located about 75 miles north of San Francisco, Calif. At the project, naturally occurring geothermal steam is processed through four turbine generator sets each rated at 55 megawatts. The geothermal steam at this site contains noncondensible gases which primarily consist of carbon dioxide ($CO_2$), methane ($CH_4$), ammonia ($NH_3$) and hydrogen sulfide ($H_2S$). In addition to the noncondensible gases, a small amount of naturally occurring mercury vapor (Hg) is also produced with the steam.

Permits for the field site require that the Hg vapor in the noncondensible gases be treated. Since sulfur and mercury have a strong chemical affinity for each other, the target gas for treatment is $H_2S$. Initially, gases from the geothermal field site were shunted to two separate filter vessel systems, one seeded with sulfur pastilles in accordance with the present invention and the other seeded with an equal size filter vessel of SIAC. Both systems were also respectively inline with two separate Redox processes for making sulfur cakes which were continuously monitored and analyzed for Hg content.

Efficiency of mercury removal was established using EPA regulation guidelines that limit Hg content of sulfur cake to less than 20 ppm for a "non-hazardous" classification. The analyses showed similar amounts of trace Hg (less than 5 ppm) in sulfur cakes from the two sour gas streams being tested by the two filter vessel systems. These tests confirm that sulfur pastilles are equally efficient at removing vaporous Hg as SIAC.

However, during the entire four years' field trial at the geothermal field site, the elemental sulfur pastille filter bed in accordance with the present invention did not require reseeding even once. In contrast, the second filter vessel system with SIAC required reseeding four times during the same four year period. Each reseeding was time consuming, costly and dangerous to the operating crew. The process of turning over the carbon required workers to become exposed to mercury contaminated carbon and a low oxygen environment due to the carbon's $O_2$ scavenging properties.

In addition, while SIAC successfully removed mercury from the gas, it had other operational problems and safety concerns. The carbon was extremely susceptible to the moisture contained in the saturated sour gas. The moisture eroded the impregnated sulfur away from the activated carbon and inhibited the uptake of Hg by improper distribution, in addition to increasing the pressure drop across the filter bed.

The new use of the alternative sulfur pastille media allowed removal of mercury from the saturated sour gas as efficiently as SIAC and was far less susceptible to moisture effects which increased the media's relative useful life.

EXAMPLE 5

Removal of Mercury from Natural and Petroleum Gas

The present invention is used to remove vaporous mercury from natural and petroleum gas feedstocks for LNG (liquified natural gas) and LPG (liquified petroleum gas) liquefaction, and for other fuel energy gas processing plants. For natural and petroleum gas, use of preheaters for moisture removal is a first choice as energy for heating is abundant and economical at gas processing plants. Natural and petroleum gases are dried with external heaters just before being passed through a filter vessel of sulfur pastilles.

Vaporous Hg is attracted to the elemental sulfur pastilles, converted to mercuric sulfide and subsequently adsorbed by the sulfur pastilles, reducing the mercury contamination of treated natural gas down to industry-acceptable concentrations of less than 0.002 micrograms of mercury per cubic feet ($\mu g/ft^3$) of natural gas.

For natural and petroleum gas applications, the present invention does not require removal of every trace amounts of moisture such as required by the state-of-the-art prior to the present disclosure. The simple reason is that sulfur pastilles are not susceptible to erosion by liquids such as triethylene glycol (TEG) and diethanolamine (DEA) which are normally used to treat natural and petroleum gases before being processed to remove vaporous mercury. It has been discovered that elemental sulfur is not soluble by TEG or DEA, or other similar organic gas processing liquids.

While the invention has been described and illustrated herein by references to various specific materials, procedures and examples, it is understood that the invention is not restricted to the particular combinations of material and procedures selected for that purpose. Numerous variations of such details can be implied as will be appreciated by those skilled in the art.

What is claimed is:

1. A process for recovering elemental mercury bound to a filter medium made of about 99.0 wt. % elemental sulfur, comprising the steps of:
    (a) spraying liquid carbon disulfide over the sulfur filter medium to which said elemental mercury is adsorbed;
    (b) allowing the sulfur to dissolve into said liquid carbon disulfide, and
    (c) allowing said elemental mercury to separate away from the sulfur/carbon disulfide solution.

2. The process of claim 1, wherein said filter medium is made of about 99.98 wt. % elemental sulfur and step (c) comprises the step of spraying said carbon disulfide over said filter medium comprised of about 99.98 wt. % elemental sulfur.

3. The process of claim 1, further comprising the step of recovering said elemental mercury as a substrate for further processing.

4. A process for recovering elemental sulfur from a spent filter medium having bound and adsorbed mercury and made of about 99.0 wt. % elemental sulfur, comprising the steps of:
    (a) spraying liquid carbon disulfide over the sulfur filter medium to which said elemental mercury is adsorbed;
    (b) allowing the sulfur to dissolve into said liquid carbon disulfide;
    (c) allowing said elemental mercury to separate away from the sulfur/carbon disulfide solution;
    (d) supplying the sulfur/carbon disulfide solution from step (c) into a container;
    (e) vaporizing the carbon disulfide out of the sulfur/carbon disulfide solution;
    (f) cooling the carbon disulfide vapor so that liquid carbon disulfide is formed, and
    (g) supplying the liquid carbon disulfide from step (f) to step (a).

5. The process of claim 4, wherein in step (e) said sulfur/carbon disulfide solution is heated to a temperature of about 117° F. to form the carbon disulfide vapor.

6. The process of claim 4, wherein said filter medium is made of about 99.98 wt. % elemental sulfur and step (a) comprises the step of spraying said carbon disulfide over said filter medium comprised of about 99.98 wt. % elemental sulfur.

7. The process of claim 4, further comprising the step of recovering said sulfur as a substrate for further processing.

* * * * *